(No Model.) 3 Sheets—Sheet 1.
G. D. BURTON.
STOCK CAR.
No. 360,370. Patented Mar. 29, 1887.
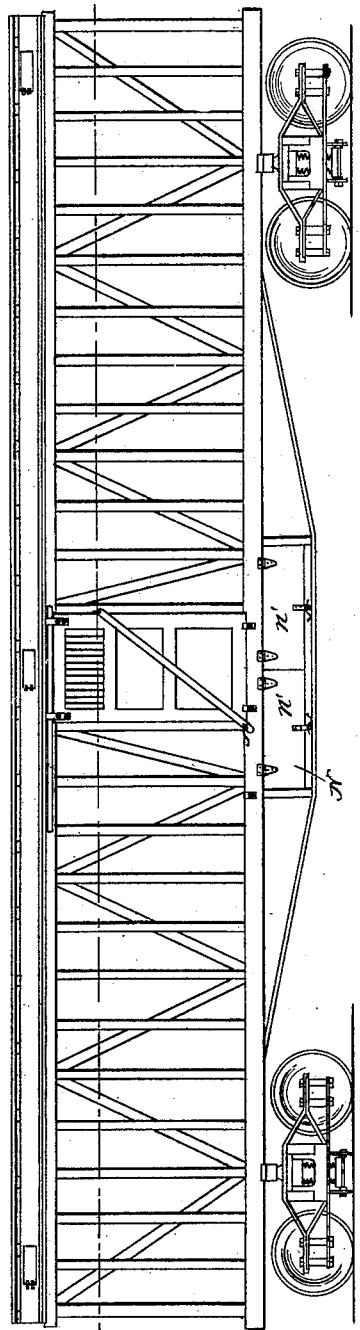
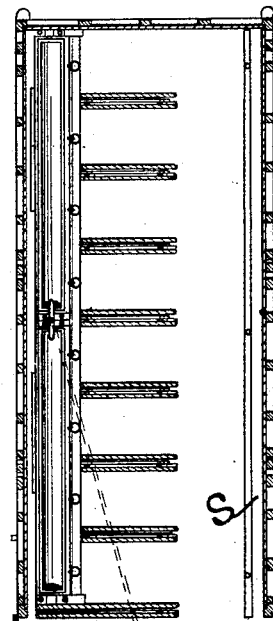
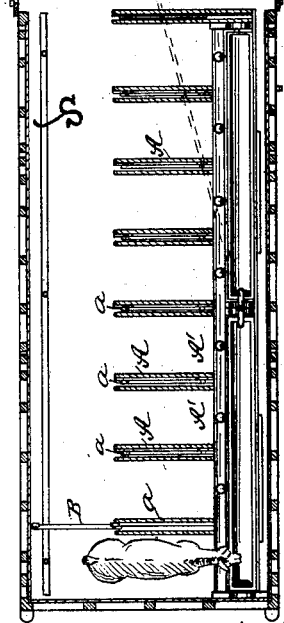
WITNESSES.
INVENTOR

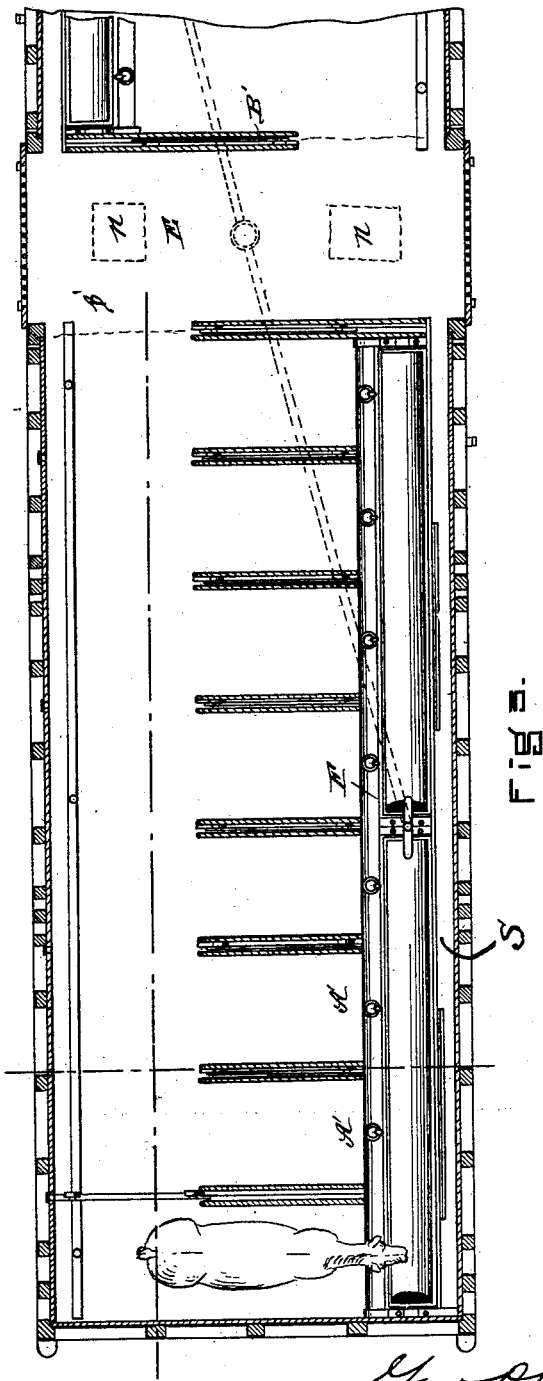

(No Model.) 3 Sheets—Sheet 3.
G. D. BURTON.
STOCK CAR.
No. 360,370. Patented Mar. 29, 1887.
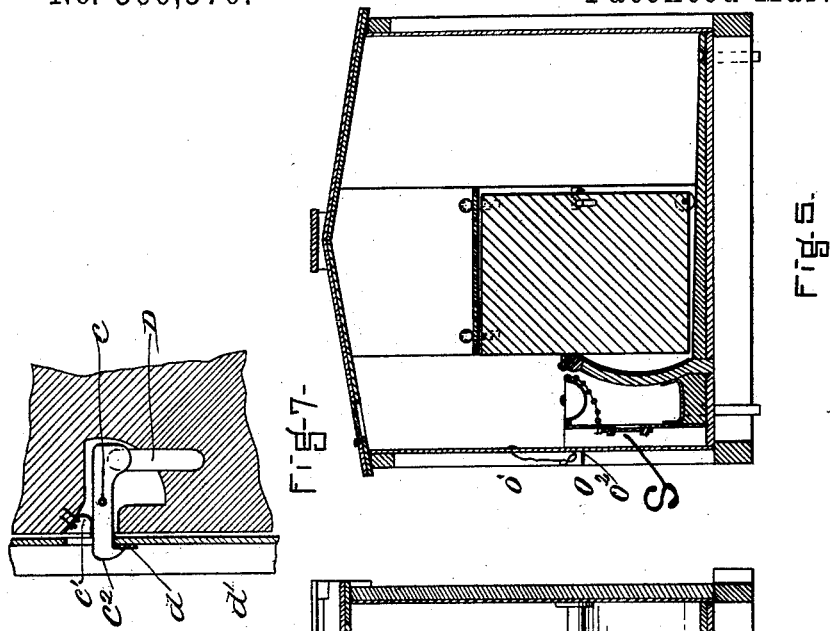
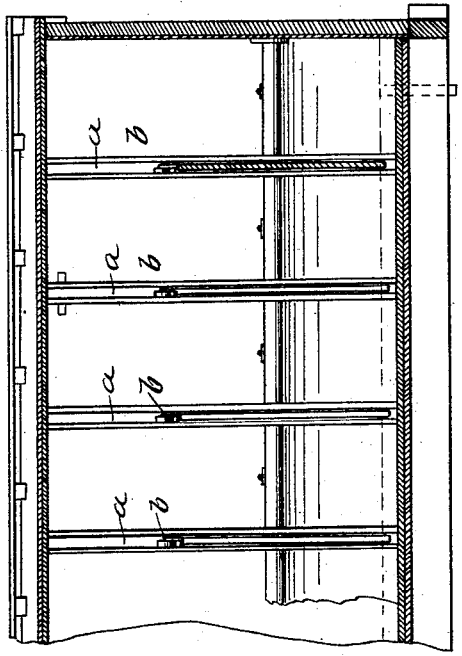
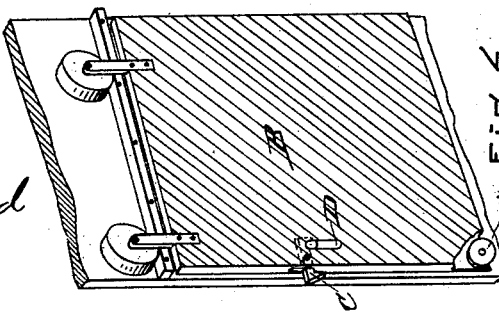
WITNESSES.
J. S. Barker
M. M. Lammond
INVENTOR.
Geo. D. Burton
by Chas. F. Barber
Attorney.

UNITED STATES PATENT OFFICE.

GEORGE D. BURTON, OF NEW IPSWICH, NEW HAMSPHIRE.

STOCK-CAR.

SPECIFICATION forming part of Letters Patent No. 360,370, dated March 29, 1887.

Application filed November 30, 1886. Serial No. 220,284. (No model.)

*To all whom it may concern:*

Be it known that I, GEORGE D. BURTON, a citizen of the United States, residing at New Ipswich, in the county of Hillsborough and State of New Hampshire, have invented certain new and useful Improvements in Stock-Cars, of which the following is a full and clear description of the preferred form of car, which will enable others skilled in the art to which my invention appertains to make and use the same, reference being had to the accompanying drawings, in which—

Figure 1 is a side elevation of a car embodying my invention. Fig. 2 is a longitudinal section taken on the line X X, Fig. 1. Fig. 3 is a plan view of the inside of a stock-car provided with my improvements. Fig. 4 is a detail view of the portion of the interior of the car, showing the position of the movable partitions. Fig. 5 is a detail view of the trough, manger, and rolling partition. Fig. 6 is a detail view of the locking-latch.

The object of my invention is to provide a stock-car in which the animals can be fed and watered while the train is running at full speed without the necessity of the attendant going outside of the car.

Another object of my invention is to provide a car in which the animals can be fed and watered without the necessity of climbing over the stock, and without endangering life or limb of the attendant, as would be the effect if he were obliged to go in among the stock to feed them.

Another object of my invention is to provide a car in which the animals will be entirely separate from each other, and one in which it will be impossible for them to get over the sides of the partitions, as they are quite likely to do when pitching and floundering in cars which are built after the old and well-known plans.

Another object of my invention is to construct a car with sliding partitions, which may be readily and quickly operated, and by the use of which each animal is entirely shut up as soon as he takes his place in the stall, thus making it impossible for two animals to get in the same stall, which causes great confusion, and which is liable to result in accident and injury to both animals and attendant.

In the drawings I show a stock-car of usual constructions, which is provided in its interior with a series of stalls arranged transversely within the car each side of its center.

By reference to Fig. 2 it will be observed that one half of the stalls front to one side of the car and are provided at their front ends with a watering and feeding trough, while the stalls at the other side of the center of the car face in an opposite direction and have the water and feed trough on the opposite side of the car, diagonally opposite the troughs in front of the first series.

The dotted lines in Figs. 2 and 3 indicate the position of the water-pipes which distribute the water into the water-troughs from a tank in the top of the car.

By reference to Fig. 2 it will be observed that each of the vertical partitions A A is provided with a sliding door, B, which is adapted to be extended back and rest against the opposite side of the car, and to be hooked back by the catch D. (Shown in Fig. 7.) It will be observed that the partitions A A are provided with vertical recesses, into which the doors B B are adapted to slide, as is clearly shown in Figs. 2, 3, 4. On one side of each of these partitions is formed a track, $a$, upon which rolls the small rollers $b$ $b$.

By reference to Fig. 6, which is a detail view of one of the sliding doors, it will be observed that the door is provided at the bottom with a roller, $b'$, which is adapted to roll along the bottom of the door and prevent the door from catching when it is being slid back and forth in the partition.

The catch C D (shown in Fig. 7) is composed of a gravity-latch, C, which is pivoted at $c$, and provided at its rear portion with a clip, D, to which it is pivoted. It is provided at its upper front portion with a spring, $c'$, which is secured by rivets or nails to the door just above the latch C. The front portion of the latch C is provided with the hook $c^2$, which is adapted to catch over and engage with the plate $d$ on the horizontal strip $d'$ of the car.

In some instances I design to operate the doors B by having the tracks $a$ $a$ extend only the length of the stationary partitions $a$ $a$, depending upon the roller $b$, as shown in Fig. 6, to support the door B at its front end when it is being moved back and forth within the slotted partition, while in other instances I design to extend the track $a$ $a$ entirely across the car, as shown in Fig. 4. In this event it will of course be necessary to have the track sufficiently high to prevent the animal from bumping its head while entering the stalls, which will meet the various tracks, all of which will be clearly understood by reference to Figs. 2, 3.

It will be observed that the closing of the doors B B will virtually inclose the space E in the center of the car, converting the same into a room for the attendant, and which will also receive and accommodate hay and grain for the stock. The traps $n$ $n$, which open through the bottom of the car into the feed-box N, will facilitate ready access to the box from the inside while the train is in motion; or the box may be entered by opening the doors $n'$ while the car is at a stand-still.

There is an aisle-space, S, in front of the stalls, which opens into the center of the room and facilitates the feeding of the stock, &c., from within while the car is in motion, as well as affording ready access to each animal without disturbing any other animal in the car.

From the above it will be observed that each animal is provided with a separate room by himself, and each stall is provided with a ring, A A, (shown in Fig. 3,) to which the animal may be attached, the ring extending in front of the line of the rear side of the beam F, to which the rings are secured, thus preventing the animal from being pressed against this ring. It is quite apparent that this beam might be perforated, and the animals fastened to the beam by running the halter-strap through the perforation in the beam without departing from the general spirit of my invention.

In some instances I design to perforate the partition or uprights in front of the animals and extend the halter strap or rope through said partition and knotting it outside of the front of the partition, or even tying a stick or other suitable weight first to the rope after it has been inserted through the perforation $o'$ in the partition. This will form a sort of automatic fastening, which will be always taut by the action of the weight, which will not offer sufficient resistance by reason of its weight to prevent the animal from raising and lowering his head and from turning his head from side to side, and yet the action of this weight will be such as to automatically take up all slack in the halter-strap the instant the horse moves his head toward the perforation $o'$, thus preventing the animal from getting his leg over the halter-strap, all of which will be clearly understood and the importance of which will be highly appreciated by all familiar with the handling of stock.

In some instances, where the weight is very heavy, it may be found desirable to provide a shelf, $o^2$, to support the weight when the animal's head is in its normal position in the stall. In fact, it is often desirable to use a heavy weight and give the animal considerable slack, and then depending upon this heavy weight, which is supported by the shelf, as a separate or precautionary contrivance, which will yield slightly in violent pulling of the animal, which may be caused by his floundering or pitching at any sudden movement of the car, either from the starting and stopping or from rounding curves along the road.

Having now described my invention, what I desire to secure by Letters Patent, and what I therefore claim, is—

1. In a stock-car of the character described, two rows of stalls arranged transversely within the car, an aisle extending along the car in front of the stalls and a vertical partition each side of the center of the car, each of which partitions is provided with a door, and which when closed converts the center of the car into a separate room, which communicates directly with the aisle-space in front of the stalls, substantially as and for the purposes specified.

2. In a stock-car of the character described, the combination of the stock-compartment and the perforated upright in front to receive the weight of the halter-strap, and provided below said perforation with a shelf to stay the downward movement of the weight on halter-strap, as and for the purposes hereinbefore explained.

In testimony that I claim the above I hereunto set my hand in the presence of two subscribing witnesses.

GEO. D. BURTON.

Witnesses:
 GEO. D. DAVIS.
 CHAS. F. ADAMS.